Figure 1:
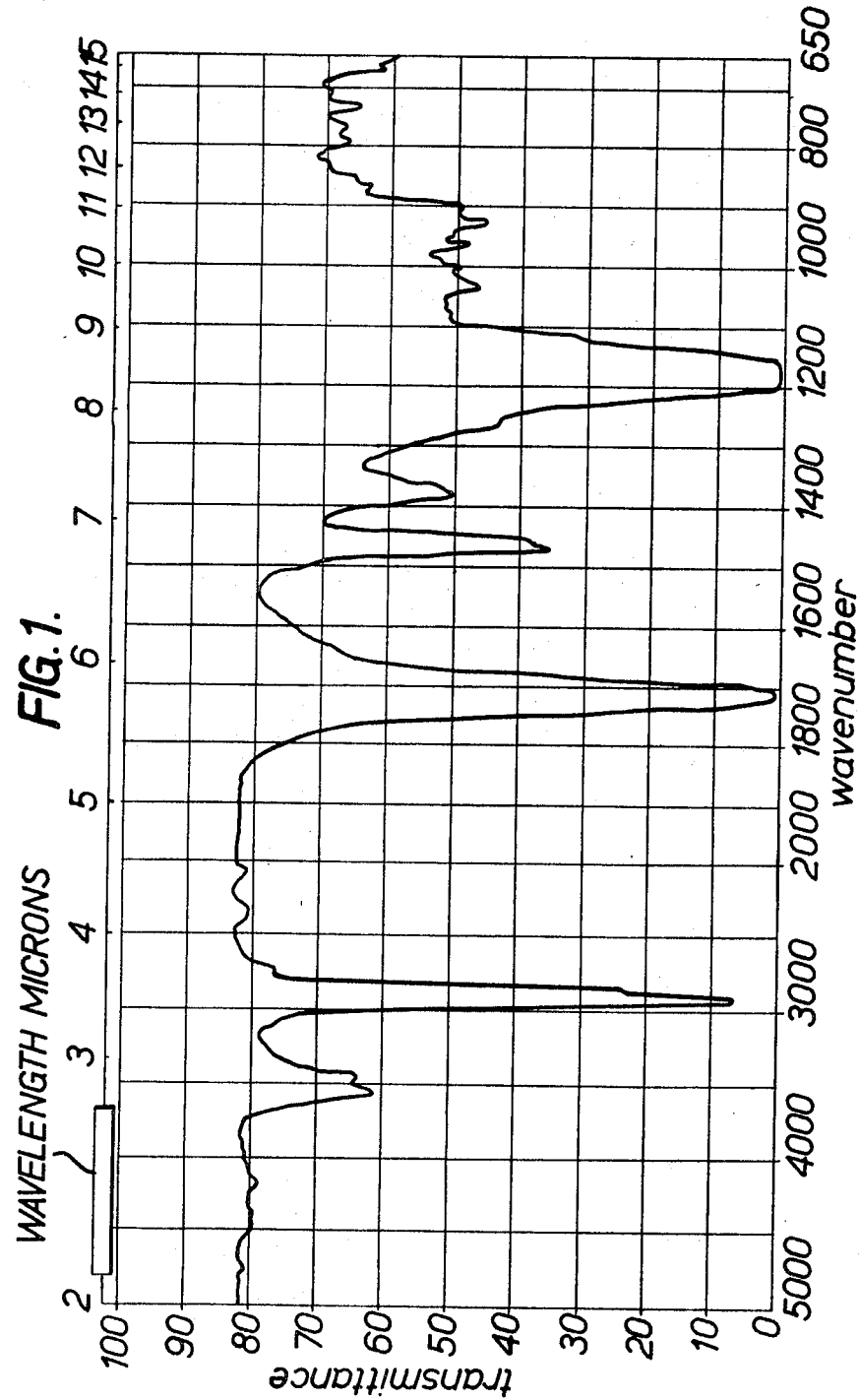
Figure 2:
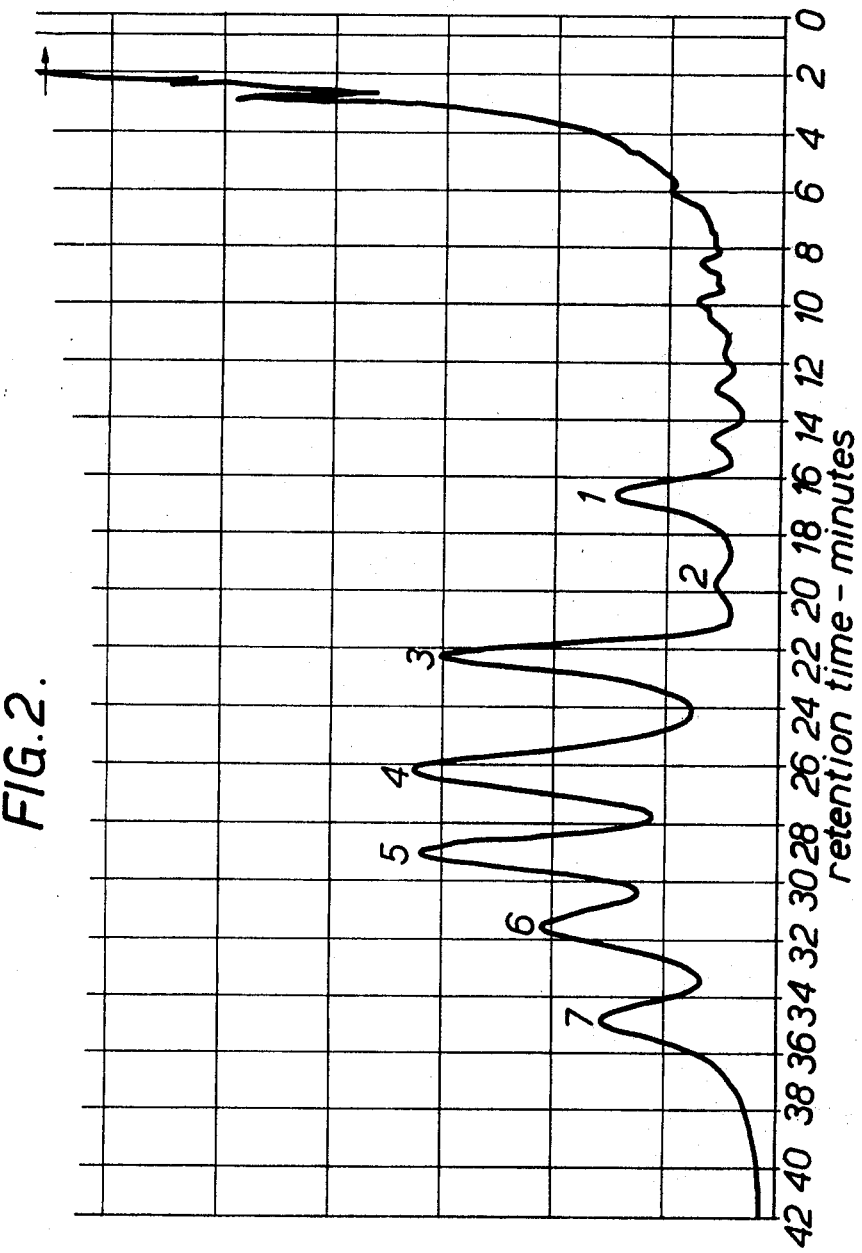
Figure 3:
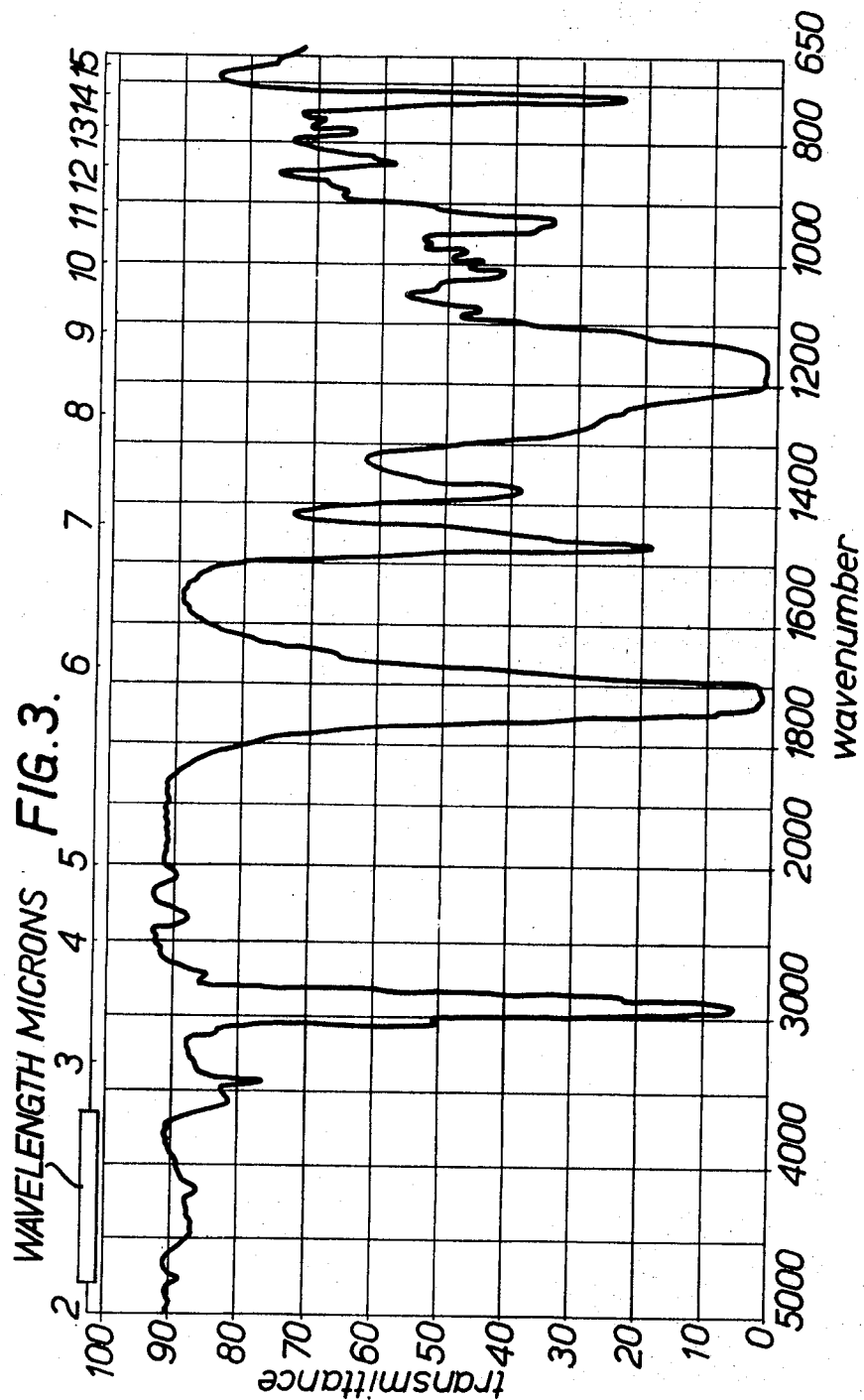
Figure 4:
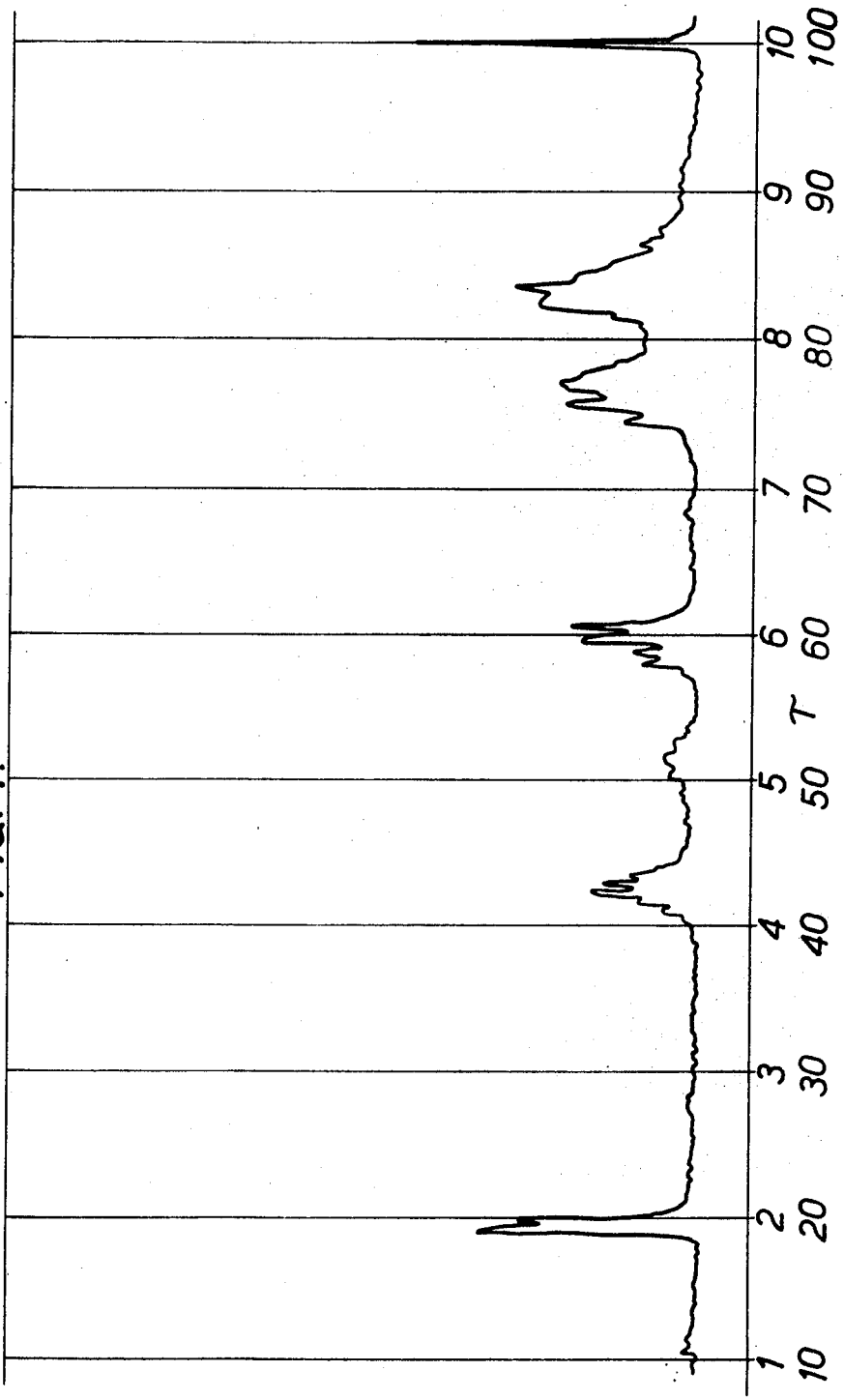
Figure 5:
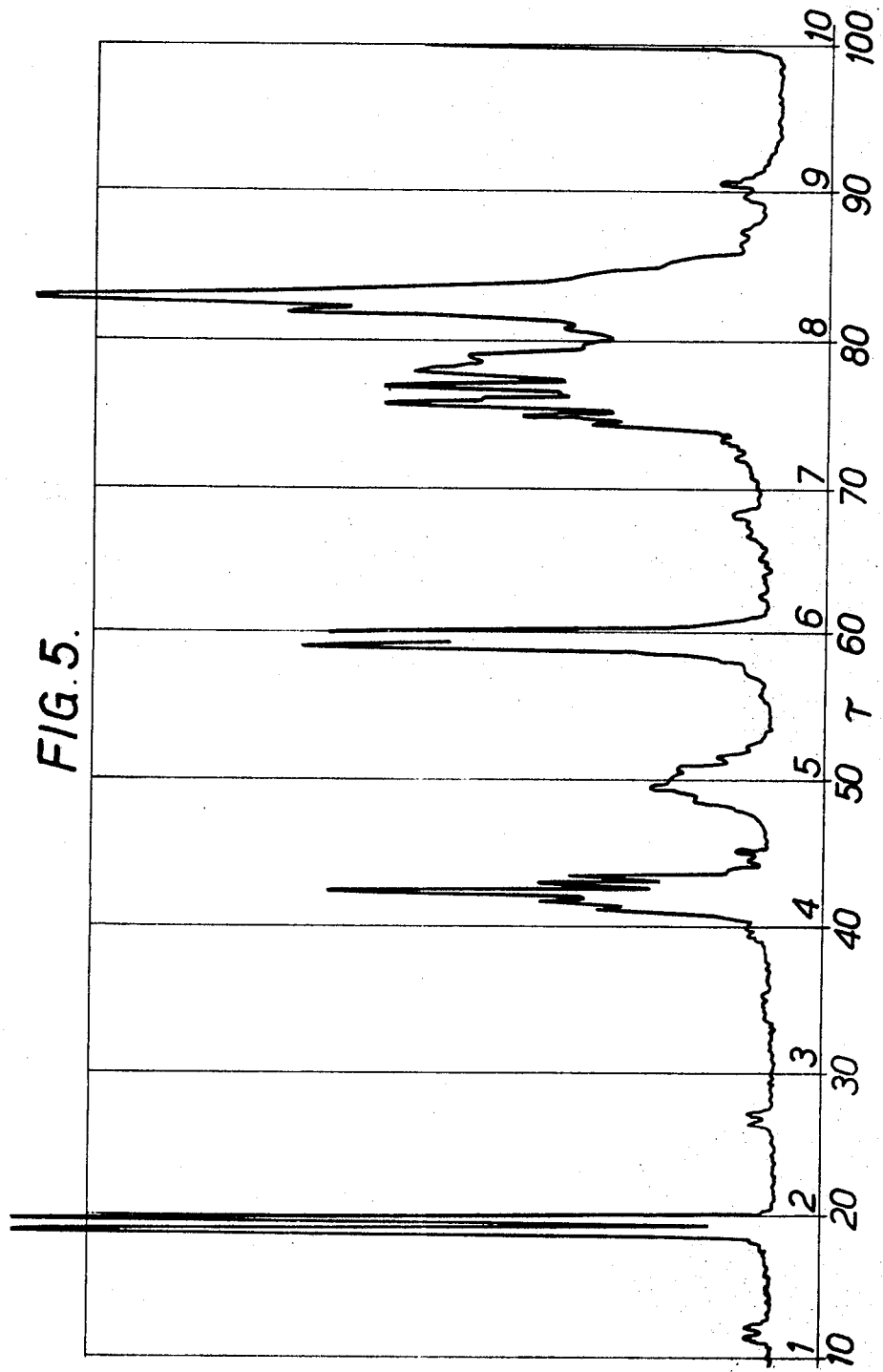
Figure 6:
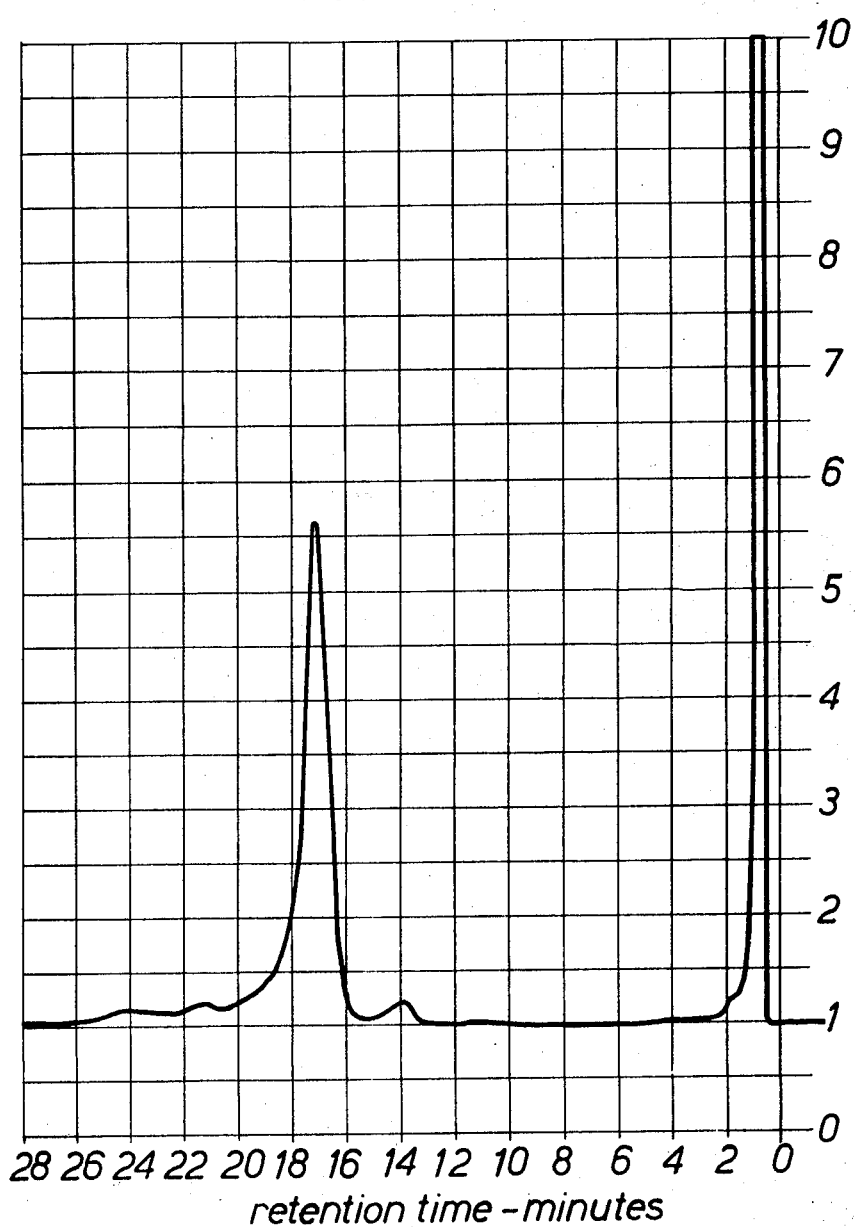
Figure 7:
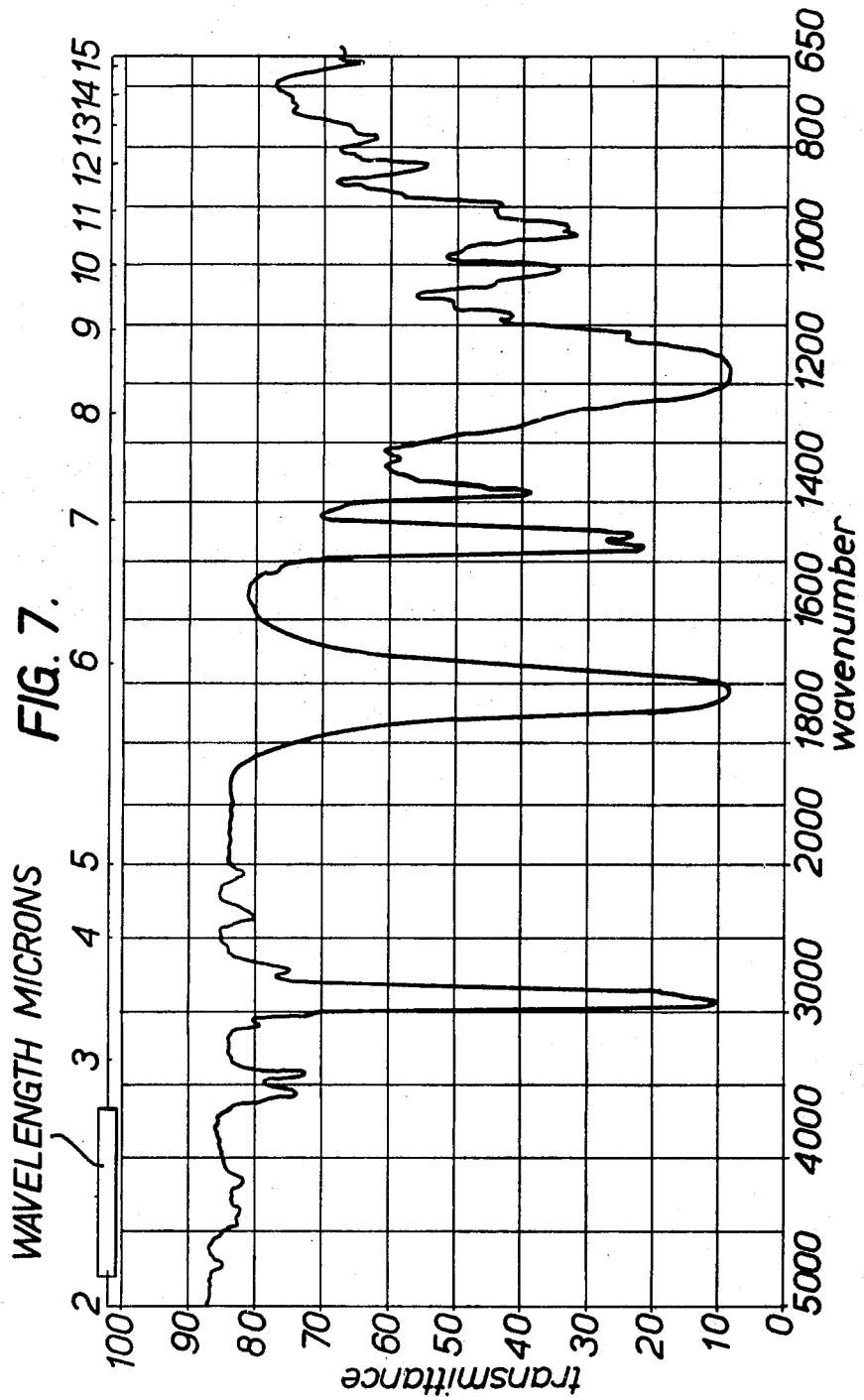
Figure 8:
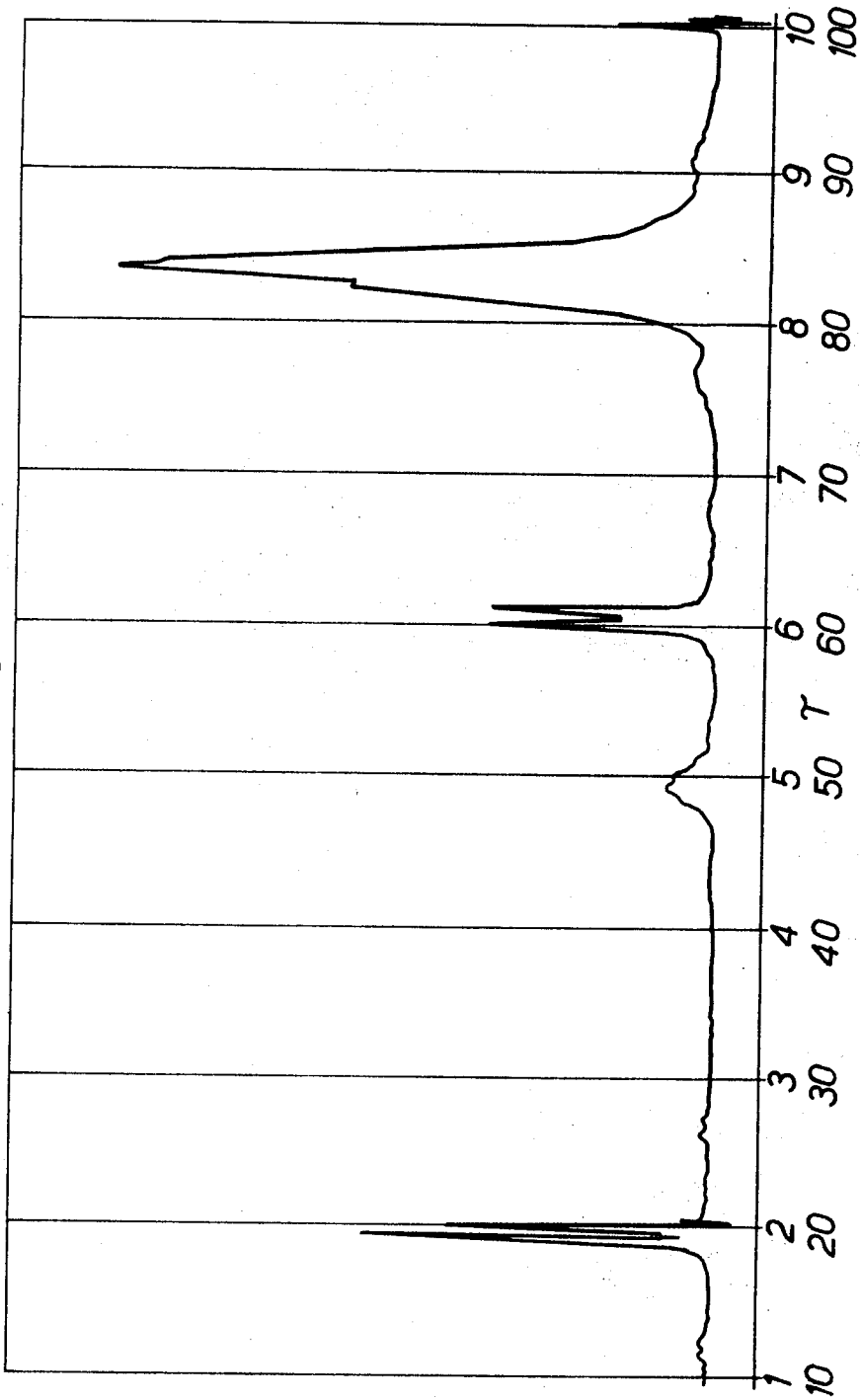
Figure 9:
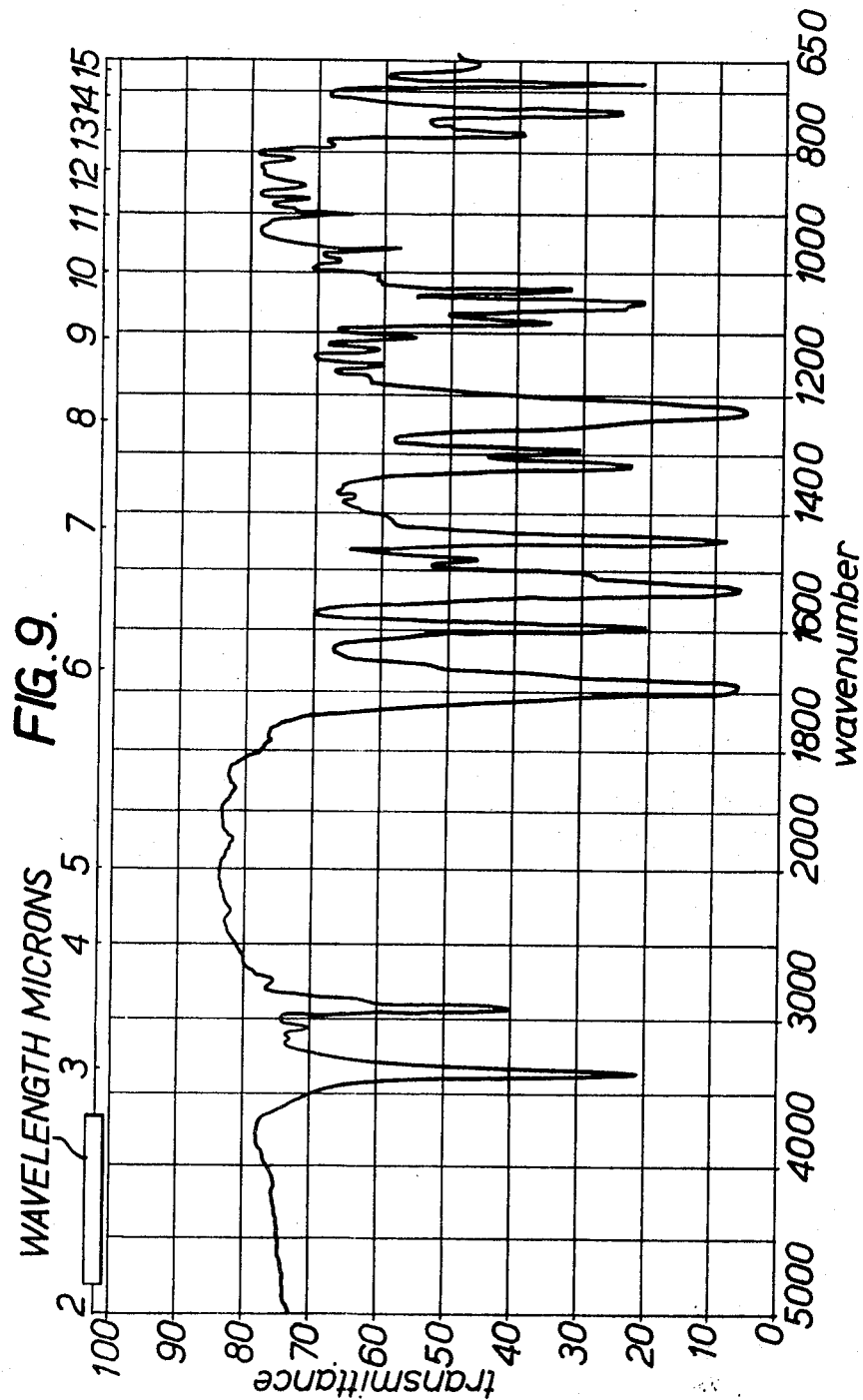
Figure 10:
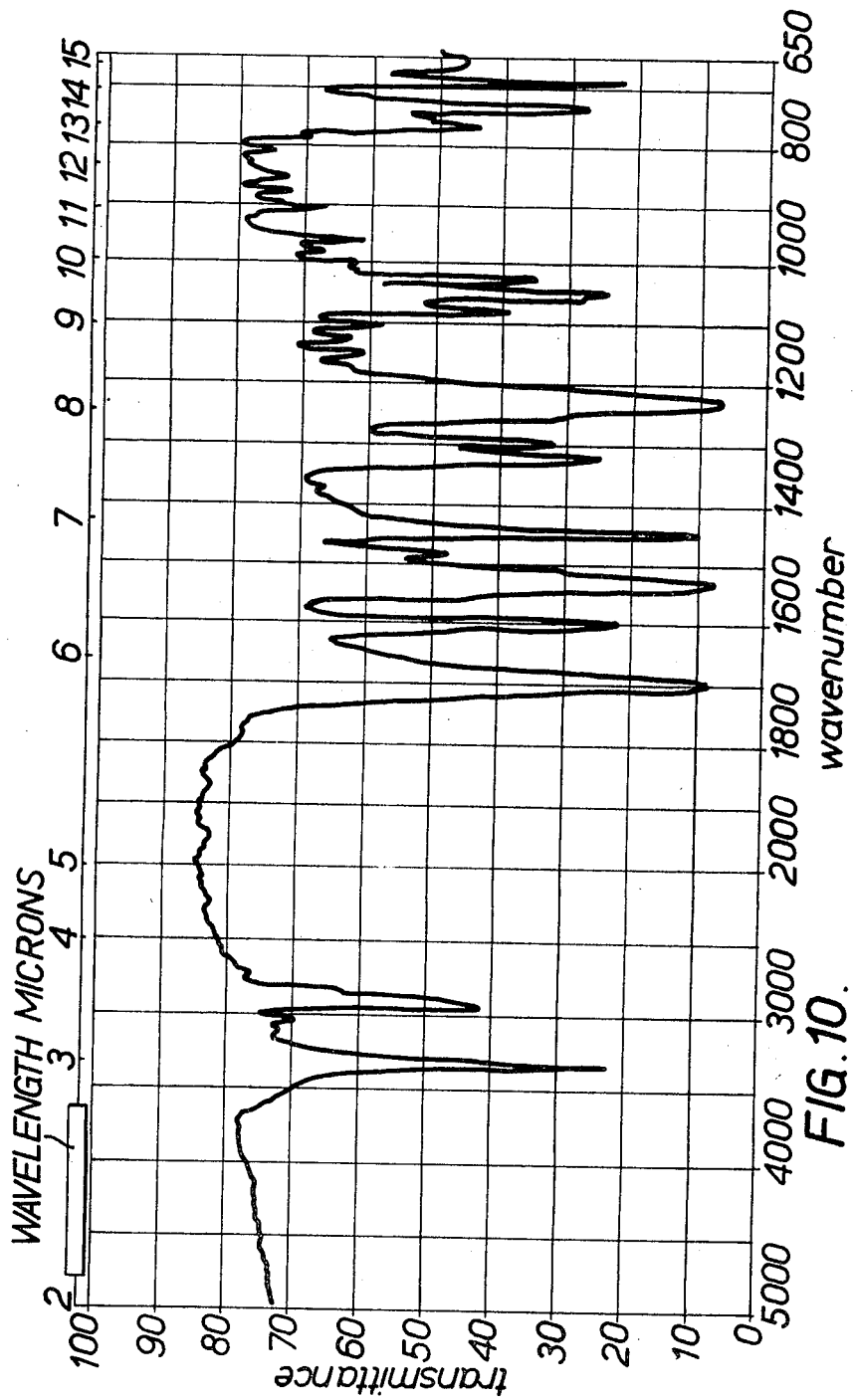
Figure 11:
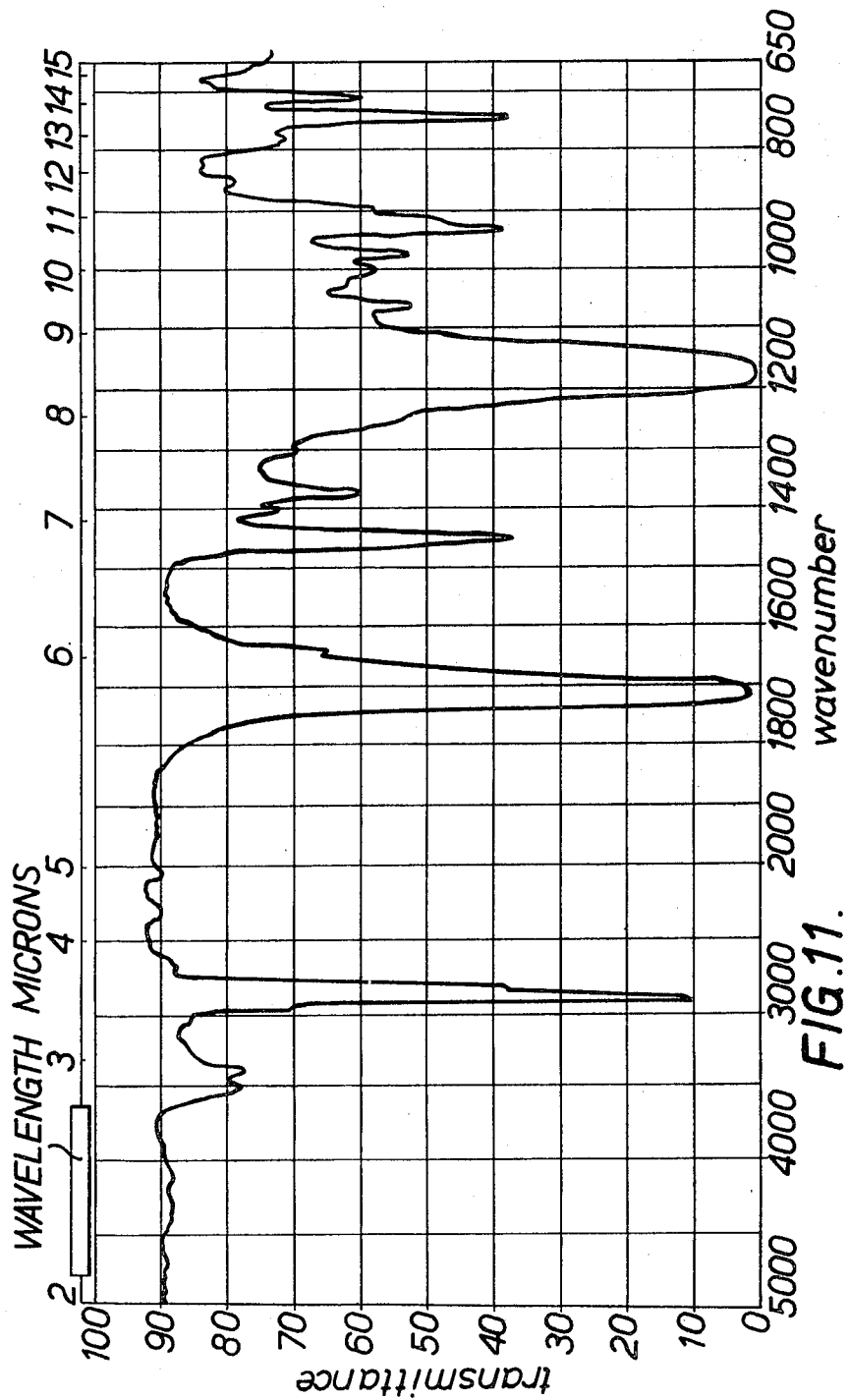
Figure 12:
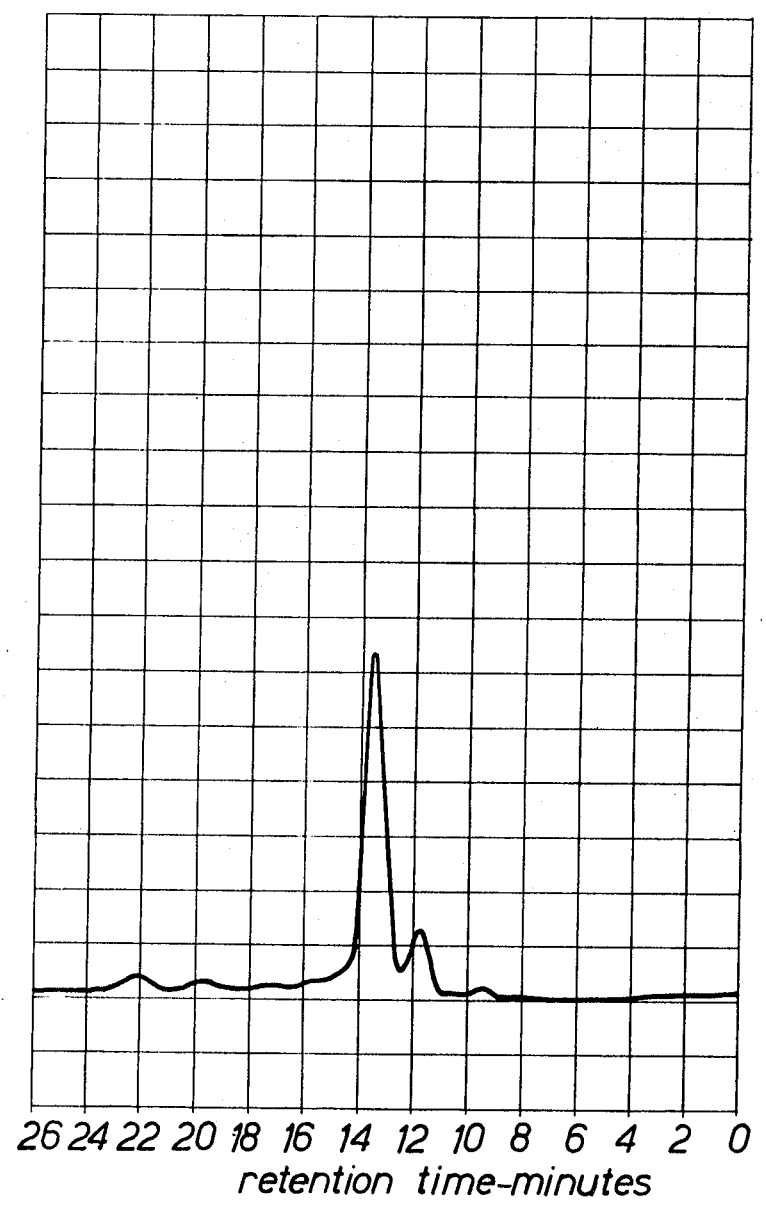
Figure 13:
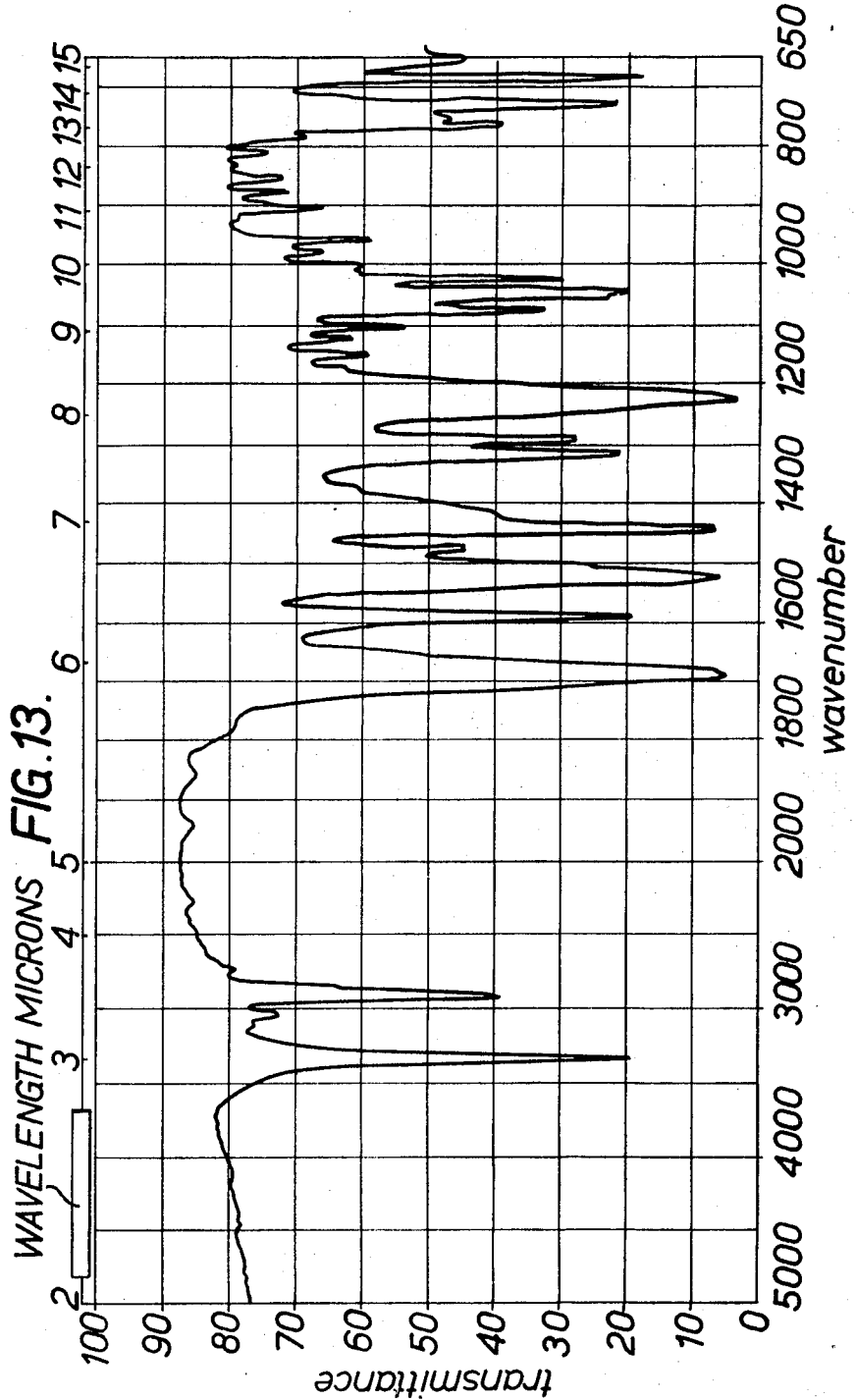
Figure 14:
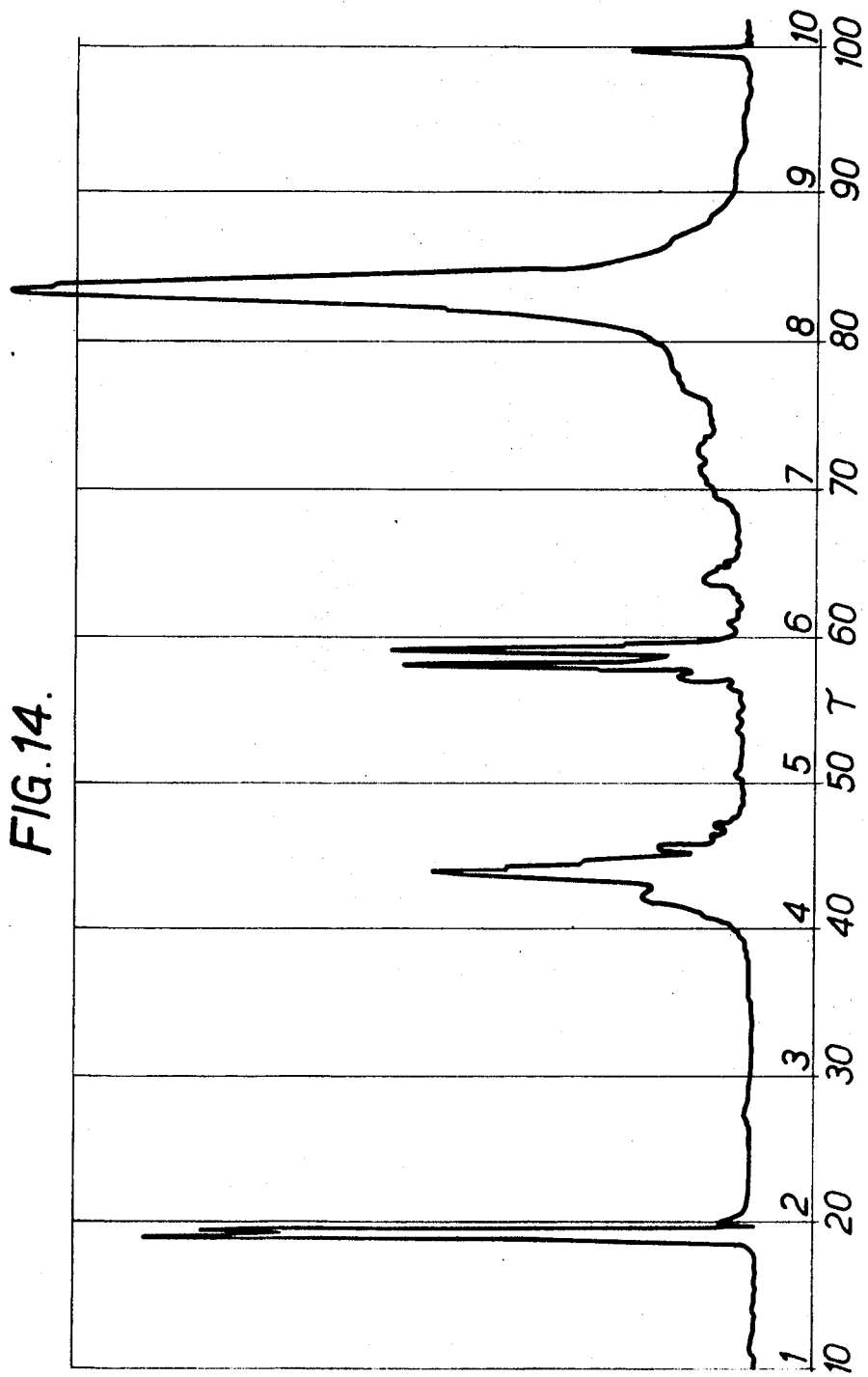

United States Patent Office 3,652,656
Patented Mar. 28, 1972

3,652,656
FORMATE ESTERS
Basil Jason Heywood and Otto Meresz, Hornchurch, England, assignors to May & Baker Limited, Dagenham, Essex, England
No Drawing. Filed Nov. 21, 1966, Ser. No. 595,663
Claims priority, application Great Britain, Nov. 26, 1965, 50,403/65; May 17, 1966, 21,839/66
Int. Cl. C07c 67/04, 69/08
U.S. Cl. 260—488 R      13 Claims This invention relates to new formate esters, to processes for their preparation and to their use in perfumery.

The Prins reaction, i.e. the acid catalyzed reaction of aldehydes such as formaldehyde and acetaldehyde with olefins, has hitherto been used to prepare many different types of organic compounds including alcohols, diols, monoesters, diesters, m-dioxans and cyclic ethers. A typical example is the application of the Prins reaction to cyclohexene utilising formaldehyde and acetic acid to give 2-acetoxy-methyl-cyclohexyl acetate originally studied by S. Olsen and H. Padberg, Naturforsch. 1 448–458 (1946) and subsequently by other workers. This di-ester does not possess properties useful in perfumery products.

It has now been found that when the Prins reaction is applied to an eight membered monocyclic hydrocarbon containing one or two olefinic linkages (i.e. cyclooctene or a cyclooctadiene), optionally carrying one or two methyl groups, utilising formaldehyde and formic acid— a reaction which has not hitherto been described—a transannular reaction occurs and diformate esters are produced which are useful in perfumery.

According to the present invention, there are provided new diformates which are obtained by reacting an unsaturated hydrocarbon selected from cyclooctene and cyclooctadiene, optionally carrying one or two methyl groups on carbon atoms not forming part of an olefinic linkage, with formaldehyde, or a compound which liberates formaldehyde (for example paraformaldehyde or methylal), in the presence of formic acid, and separating from the reaction mixture the diformate or diformates so produced. The new diformates of the present invention possess very interesting odours and have proved to be very versatile and extremently useful in the formulation of various types of perfumery products. For example, they may be used in formulations in place of "orris concrete," an expensive natural perfumery material.

The reaction may be carried out at temperatures between 0° C. and the reflux temperature of the reaction mixture, using formic acid of concentrations between 50% and 100% w./w. in proportions of two equivalents to a considerable excess and formaldehyde, or a compound which liberates formaldehyde (preferably paraformaldehyde), in proportions to give a molecular ratio of unsaturated hydrocarbon to formaldehyde in the range of 1:1 to 1:2. The reaction is preferably carried out in the presence of an excess of formic acid over the two equivalents required to form the diformate. Formaldehyde may be introduced into the reaction in the form of an aqueous solution, e.g. a 40% w./v. aqueous solution. Reaction may be effected in the presence of an antioxidant, such as butylated hydroxy anisole, and an alkali metal formate, for example sodium formate, preferably in a proportion of 2–10% by weight of the formic acid used, in order to limit the extent of undesirable side-reactions such as the addition of formic acid to the olefinic linkages.

The perfumery products of the present invention obtained by the process described above may be a single diformate, as is the case when the unsaturated hydrocarbon starting material is cyclooctene, or mixtures of diformates, as is the case when the unsaturated hydrocarbon is a cyclooctadiene, of a complexity which varies according to the starting material. In every instance, however, a crude reaction product is obtained from which a diformate fraction useful in perfumery can be separated. Isolation and purification of the diformate fraction may be effected by conventional methods such as distillation or chromatography.

When the useful diformate fractions are mixtures of two or more diformates, the mixtures may, if desired, be separated into their individual components by the application of known methods for the separation of mixtures, such as fractional distillation, countercurrent distribution, and chromatographic techniques. Mixtures of diformates may also be converted by hydrolysis (for example using a strong alkali such as potassium hydroxide, in an alcohol containing up to six carbon atoms, preferably methanol) into mixtures of diols, and these mixtures may then be separated into their components by the methods mentioned above, after which the separated diols may be reformylated to give the individual diformates. For the purpose of monitoring the separation of mixtures, the most convenient method has been found to be gas-liquid chromatography, but any other method known to be useful in monitoring the separation of mixtures of organic compounds may also be used, for example thin layer chromatography. The structures of individual diformates of the present invention have been identified as hereinafter described by examination of their infra-red spectra, nuclear resonance spectra and mass spectra.

The mixtures of diformates are, however, useful as such and it is normally unnecessary to separate them into their component diformates. Accordingly, it should be understood that the present invention includes within its scope both individual diformates and mixtures of diformates as hereinbefore described which are useful as synthetic perfumery material.

Preferred products of the present invention are those obtained from cyclooctene and cyclooctadiene unsubstituted by methyl groups. Individual products of particular value are:

(a) 4-formoxymethyl-cyclooctyl formate, the single diformate ester which can be isolated from the reaction of cyclooctene with formaldehyde and formic acid, (b) the diformate fraction $C_{11}H_{16}O_4$ isolated from the reaction of cycloocta-1,5-diene with formaldehyde and formic acid, B.P. 90–110° C./0.05 to 0.2 mm. Hg, density 1.1–1.2 g./ml. at 22° C., refractive index 1.47–1.50 at 21° C. in the D line of sodium. The fraction is a complex mixture of diformates, two of which, 3-formoxymethyl-cyclooct-5-enyl formate and 6-formoxymethyl-cyclooct-3-enyl formate, are particularly important in producing the valuable properties of the mixture, and (c) the diformate fraction $C_{11}H_{16}O_4$ isolated from the reaction of cycloocta-1,3-diene with formaldehyde and formic acid, B.P. 170–178° C./22 mm. Hg. The fraction is a mixture of two diformates, 4-formoxymethyl-cyclooct-2-enyl formate and 2-formoxymethyl-cyclooct-7-enyl formate.

According to a further feature of the present invention, new diformate esters may be prepared by the formylation of the corresponding diols. The formylation may be carried out by any known method, for example by the action of formic acid at ambient temperatures. The diol starting materials used in this process may be prepared:

(a) By hydrolysis of a diester other than the diformate, for example the diacetate, prepared by the Prins reaction on cyclooctene or a cyclooctadiene, optionally carrying one or two methyl groups on carbon atoms not forming part of an olefinic linkage, using formaldehyde and an organic acid other than formic acid, optionally in the presence of a strong mineral acid such as perchloric acid.

The hydrolysis of the diester may be carried out by any known method, for example by the action of a strong alkali, such as potassium hydroxide, in an alcohol containing up to 6 carbon atoms, such as methanol.

(b) By the Prins reaction on a similar unsaturated hydrocarbon as mentioned in (a) above using formaldehyde and a strong mineral acid, such as perchloric acid, and in the absence of any organic acid.

Mixtures of diesters other than diformates may also be separated and the separations monitored by the methods mentioned above, after which the separated components may be converted by known methods into the corresponding diformates.

Diol starting materials which may be formylated are 4-hydroxymethyl-cyclooctanol, 3-hydroxymethyl-cyclooct-5-en-1-ol, 6-hydroxymethyl-cyclooct-3-en-1-ol, 4-hydroxymethyl-cyclooct-2-en-1-ol or 2-hydroxymethyl-cyclooct-7-en-1-ol, or mixtures of 3-hydroxymethyl-cyclooct-5-en-1-ol and 6-hydroxymethyl-cyclooct-3-en-1-ol, or 4-hydroxymethyl-cyclooct-2-en-1-ol and 2-hydroxymethyl-cyclooct-7-en-1-ol.

According to another feature of the present invention, saturated diformates within the scope of the present invention are prepared by the process which comprises reduction of the corresponding cyclooctenyl diformates by any known method for reducing an olefinic linkage without affecting a formate ester group, for example by the action of hydrogen under pressure in the presence of a catalyst such as palladium on charcoal or Raney nickel. The cyclooctenyl diformate starting material may be 3-formoxymethyl-cyclooct-5-enyl formate, 6-formoxymethyl-cyclooct-3-enyl formate, 4-formoxymethyl-cyclooct-2-enyl formate, or 2-formoxymethyl-cyclooct-7-enyl formate.

By the term "known methods" as used in this specification and accompanying claims is meant methods heretofore used or described in the literature.

The following examples illustrate the preparation of the new products of the present invention.

EXAMPLE I

Paraformaldehyde (93.8 g.) and formic acid (90% w./w. aqueous solution, 350 ml.) were stirred and heated just to reflux, the heating was stopped and cis,cis-cycloocta-1,5-diene (220 g.) was added with vigorous stirring over six minutes. The resulting exothermic reaction caused spontaneous refluxing to occur. On complete addition the mixture was refluxed for four hours, during which time it darkened and the paraformaldehyde dissolved. After cooling, the mixture was diluted with water (1.75 litres), and extracted with methylene chloride (700 ml.). The organic phase was separated, washed sequentially with water (250 ml.) and saturated sodium bicarbonate solution (250 ml.), then dried over magensium sulphate. The desiccant was removed by filtration, and the filtrate evaporated in vacuo. The residue was distilled through a 6 inch Vigreux column under vacuum to give the following fractions:

Fraction A1: B.P. 55–142° C. at 17 mm. Hg, 67 g.

Fraction A2: B.P. 142–197° C. at 17 mm. Hg, 200 g.

Fraction A2 was redistilled under high vacuum through a 6 inch Vigreux column to give the following fractions:

Fraction B1: B.P. 75–95° C. at 0.06 mm. Hg, 21 g.

Fraction B2: B.P. 95–100° C. at 0.06 mm. Hg, 141 g. (33% calculated as $C_{11}H_{16}O_4$).

Fraction B2 was a colourless liquid possessing a persistent orris odour with a suggestion of methyl heptine carbonate, density $d_4^{22}$ 1.148 g./ml., refractive index $n_D^{21}$ 1.4865. The infra-red spectrum of this mixture is given in FIG. I of the accompanying drawings.

The corresponding diol mixture was prepared by hydrolysis of fraction B2 using potassium hydroxide in methanol. Examination of this diol mixture by gas-liquid chromatography (0.5% diethylene glycol succinate polymer stationary phase on Chromosorb G 70–80 mesh support; column temp. 150° C.) revealed that it consisted of seven main components as shown by the chromatogram which is FIG. II.

The structure, physical data and method of separation of the diformate components are given in Table I. Phenylurethane derivatives were prepared by known methods from the separated diols, themselves prepared either by hydrolysis of the diformate mixture and separation from the mixture of the diols obtained, or by hydrolysis of the separated diformates obtained from the diformate mixture. Hydrolysis in either case is effected with potassium hydroxide in methanol. The structural formulae of the components were elucidated by nuclear magnetic resonance spectroscopy and mass spectroscopy.

Olfactory examination of the various components of fraction B2 indicated that the components 6 and 7 imparted on the mixture of the valuable orris-like odour, and the process for isolation of these components is given in Examples V and VI.

TABLE I

| Component | Structure | Diformate component | Approx. percentage in mixture | Diol peak in Figure II | Melting point of phenylurethane derivative, °C. | Method of separation |
|---|---|---|---|---|---|---|
| 1 | HOCO—⌬—CH₂OCOH | Endo-4-formoxy-1-formoxymethyl-cis-bicyclo-[3.3.0.]-octane. | 6 | 1 | | Counter-current distributions on low boiling fractions from distillation of ester mixture, followed by repeated chromatography on Florisil. |
| 2 | ⌬ CH₂OCOH / OCOH | Trans-2-formoxymethyl-cyclooct-5-enyl formate. | 3 | 2 | 168.5–170 | Chromatography of a main distillation fraction from efficient fractionation of the mixture, using AgNO₃ impregnated silica gel column. |
| 3 | HOCO—⌬—CH₂OCOH | Endo-2-formoxy-exo-6-formoxymethyl-cis-bicyclo-[3.3.0.] octane. | 14 | 3 | 168–169 | Counter-current distributions on certain hydrolysed high-boiling fractions from the distillation of the ester mixture, followed by column chromatography on silica gel. |
| 4 | HOCO—⌬—CH₂OCOH | Exo-2-formoxy-endo-6-formoxymethyl-cis-bicyclo[3.3.0.] octane. | 22 | 4 | 175–176 | Counter-current distributions on diol mixture. |

| Component | Structure | Diformate component | Approx. percentage in mixture | Diol peak in Figure II | Melting point of phenyl-urethane derivative, °C. | Method of separation |
|---|---|---|---|---|---|---|
| 5 | HOCO—⟨—H  CH₂OCOH | Endo-8-formoxy-endo-2-formoxy-methyl-bicyclo [3.2.1.]octane. | 18 | 5 | 178–179 | Counter-current distributions and column chromatographies on a hydrolysed main distillation fraction from efficient fractionation of ester mixture. |
| 6 | CH₂OCOH / —OCOH | 3-formoxymethyl cyclooct-5-enyl formate (main component). | 14 | 6 | | Chromatography on AgNO₃ impregnated silica-gel column of a high-boiling fraction from efficient fractionation of ester mixture. |
| 7 | CH₂OCOH / OCOH | 6-formoxymethyl cycloocta-3-enyl formate. | 12 | 7 | 193 | Alternate counter-current distributions and column chromatographies on hydrolysed residue from efficient fractionation of ester mixture. |

EXAMPLE II

Paraformaldehyde (451 g.) and formic acid (98–100% w./w.; 2,500 ml.) were heated together under reflux until all solid had dissolved. The solution was cooled to room temperature and cis,cis-cycloocta-1,5-diene (1080 g.) was added. The mixture was stirred vigorously for three days at room temperature, during which time the heterogeneous mixture became homogeneous. Excess formic acid was removed in vacuo keeping the temperature below 40° C. and the residue distilled to give the following fractions:

Fraction A1: B.P. below 90° C. at 0.5 mm. Hg, 720 g.
Fraction A2: B.P. 90–126° C. at 0.5 mm. Hg, 1070 g.
Fraction A2 was redistilled through a 35 cm. vacuum-jacketed Widmer column to give the following fractions:
Fraction B1: B.P. below 102° C. at 0.2 mm. Hg, 90 g.
Fraction B2: B.P. 102–109° C. at 0.2 mm. Hg, 787 g., 37% yield, calculated as $C_{11}H_{16}O_4$.

Fraction B2 had an identical odour to that of fraction B2 in Example I.

EXAMPLE III

A mixture of cis,cis-cycloocta-1,5-diene (108 g.), formic acid (90% w./w.; 350 ml.) and aqueous formaldehyde (40% w./v.; 75 ml.) was stirred for 5 days at room temperature. The resultant heterogeneous mixture was treated by the method used in Example I to give a fraction B.P. 100–105° C. at 0.2 mm. Hg, 51 g., 25% yield calculated as $C_{11}H_{16}O_4$. This fraction had an identical odour to that of fraction B2 in Example I.

EXAMPLE IV

A mixture of cis,cis-cycloocta-1,5-diene (44 g.), paraformaldehyde (24 g.), 90% w./w. formic acid (100 ml.), anhydrous sodium formate (5 g.) and butylated hydroxy anisole (0.5 g.) was heated at reflux for 8 hours. The reaction mixture was allowed to cool to below 30° C. and poured into water (500 ml.). The separation of organic material was facilitated by the addition of methylene chloride (200 ml.). The methylene chloride solution was sequentially washed with water (2× 250 ml.), saturated aqueous sodium bicarbonate solution, (250 ml.), dried over magnesium sulphate, filtered, and evaporated from a steam bath at atmospheric pressure. The crude product obtained was fractionally distilled through a ¾ inch diameter, 6 inch Vigreux column to give the following fractions:

Fraction A1: B.P. 40°–70° C. at 10 mm. Hg, 3.0 g.
Fraction A2: B.P. 80°–100° C. at 10 mm. Hg, 4.2 g.
Fraction A3: B.P. 105°–138° C. at 10 mm. Hg, 11.8 g.
Fraction A4: B.P. 140°–170° C. at 10 mm. Hg, 35.5 g.
Fraction A5: B.P. 170–220° C. at 10 mm. Hg, 11.2 g.
Fraction A4 was redistilled to give a fraction B.P. 95–97° C. at 0.1 mm. Hg, 30.0 g., 37% yield calculated as $C_{11}H_{16}O_4$. This fraction had an identical odour to that of fraction B2 in Example I.

EXAMPLE V

A sample of the product (540 g.) obtained as fraction B2 in Example I was partitioned between n-heptane and 50% aqueous methanol in five portions using a counter-current technique of 5 cycles, 5 funnels and 1 litre phase volumes. The heptane-soluble material was recovered by evaporation of the solvent, yielding 350 g. material. This material was distilled from a three necked round-bottomed flask fitted with an air bleed and thermometer and employing a 1.5 metre heated glass column packed with knitted monel alloy. The reflux head, fitted with a vertical Liebig condenser, had a solenoid-operated pulsating valve to control reflux ratio.

A total of 271 g. of distillate was obtained in 34 arbitrary fractions of approximately 8 g. each. Fraction 29, B.P. 115.4–115.8° C. at 1.5 mm. Hg, was shown by gas-liquid chromatography on diethyleneglycol succinate polymer to contain approximately 30% of component 6 described in Table I, without appreciable amounts of any other unsaturated materials, i.e. components 2 and 7 described in Table I.

400 mg. of fraction 29 was therefore chromatographed on a silver nitrate impregnated silica gel column. The column packing was prepared by mixing chromatography grade silica gel (110 g.) with silver nitrate solution (10% w./v.; 230 ml.), drying, and activating the packing overnight in an oven at 90° C. The column, employing 20 g. of the packing, was made up in a 25 ml. burette (1 cm. diameter). A 3:1 mixture of diethyl ether and n-hexene was used as eluant. The following fractions were collected and evaporated to yield diformate material:

(a) First 16 ml. giving saturated material (250 mg.)
(b) Next 8 ml., giving a mixture of saturated and unsaturated material (50 mg.)
(c) Next 150 ml., giving predominantly unsaturated material (100 mg.)

400 mg. of material obtained in the same manner as (c) above was rechromatographed on a Florisil column, eluting with methylene chloride. The first 9 ml. of eluent was discarded, and the next 20 ml. yielded 250 mg of material.

950 mg. of material obtained by the same procedure was distilled under high vacuum in a bulb tube to give 350 mg. of product, boiling at an air bath temperature of 80–110° C. under 0.006 mm. Hg; the infra-red spectrum of this fraction is given in FIG. III.

Gas-liquid chromatography of this product, and of the diol obtained on hydrolysis of a portion of this product, indicated the presence of two components. The major diester component possessed a pleasant violet-orris odour, and was shown by nuclear magnetic resonance spectroscopy (FIG. IV) to be 3-formoxymethyl-cyclooct-5-enyl formate.

EXAMPLE VI

Fraction B2 of Example II (787 g.) was distilled using the apparatus described in Example V. Thirty arbitrary fractions were collected of approximately 20 ml. each; 90 g. of residue remained. This residue was shown by gas-liquid chromatography to contain a large proportion of diformate material, as well as some high-boiling by-products. It was hydrolysed by methanolic potassium hydroxide to give the corresponding diol material together with the high-boiling by-products. Gas liquid chromatography of the diol showed it to be almost exclusively the diol corresponding to component 7 in Table I.

Purification of this diol was effected by a sequence comprising alternate column chromatography separations and manual counter-current distributions, the final purification being effected by an automatic counter-current distribution using 56 cycles, followed by three successive column chromatography separations.

The distribution experiments, both manual and automatic, employed a methylene chloride-water system, material being recovered from the aqueous layer by saturation with sodium chloride and extraction with an equal volume of ethyl acetate. Column chromatography was carried out using 33 x 2.5 cm. columns of chromatography grade silica gel. A graded elution technique was used, starting with diethyl ether containing 1% ethanol, and increasing the proportion of ethanol to 20%. The processes were monitored by thin layer and gas-liquid chromatography.

15 g. of crude diol yielded 0.8 g. of pure diol corresponding to component 7 of Table I.

Material obtained in this manner was converted to a crystalline phenylurethane, which, after two recrystallisations from glacial acetic acid, had a melting point of 193° C. Elemental microanalysis gave the following results:

$C_{23}H_{26}N_2O_4$ requires (percent): C, 70.1; H, 6.6; N, 7.1. Found (percent): C, 70.4; H, 6.6; N, 7.2.

800 mg. of pure diol were converted back to the diformate by the action of 98–100% w./w. formic acid at room temperature to give 6300 mg. of product. This product was distilled in a bulb tube at 120° C. (air bath temperature) under 0.2 mm. Hg. The diformate distillate possessed a pleasant woody-orris-like odour, and was shown by nuclear magnetic resonance spectroscopy (FIG. V) to be 6-formoxymethylcyclooct-3-enyl formate.

EXAMPLE VII

Paraformaldehyde (18 g.) and formic acid (98–100%; 100 ml.) were heated together with stirring in a 500 ml. conical flask on a hotplate-magnetic stirrer and allowed to reflux until all of the paraformaldehyde had dissolved (10 min.). The solution was cooled to room temperature and cyclo-octene (redistilled; 44 g.) was added, giving a heterogeneous mixture. The mixture was stirred at room temperature for 2 days. The excess formic acid was removed by vacuum distillation on a rotary evaporator below 30° C. The residue was dissolved in methylene chloride (150 ml.) and washed once with water (75 ml.) and once with saturated sodium bicarbonate solution (75 ml.). The organic phase was dried over magnesium sulphate and filtered. After removal of the organic solvent on the rotary evaporator, and low-boiling material at water pump pressure by conventional distillation, the remainder was distilled using a high vacuum pump giving only a moderately high vacuum.

The following broad fractions were collected:

Fraction A1: B.P. 85–95° C. at 4 mm. Hg, 9 g.
Fraction A2: B.P. 95–130° C. at 4 mm. Hg, 6 g.
Fraction A3: B.P. 130–144° C. at 4 mm. Hg, 41 g.

Redistillation of the third fraction at water pump pressure (11 mm.) gave:

Fraction B1: B.P. 150–156° C. at 11 mm. Hg, 6 g.
Fraction B2: B.P. 156–159° C. at 11 mm. Hg, 33 g., 39% yield calculated as $C_{11}H_{18}O_4$.

Fraction B2 had a refractive index of $n_D^{21.0}=1.4769$, and an odour suggestive of violet with a persistent orris-like undertone. It was shown by gas-liquid chromatography (0.5% diethylene glycol succinate polymer stationary phase on Chromosorb G. 70–80 mesh support; column temp. 150° C.) to be substantially a single substance (FIG. VI), and infra-red spectroscopy (FIG. VII), nuclear magnetic resonance spectroscopy (FIG. VIII) and mass spectroscopy showed it to be 4-formoxymethyl-cyclooctyl formate.

The same product is obtained in similar yield when the reactants are refluxed together for four hours and subjected to the same working up procedure.

A sample of fraction B2 was converted to the corresponding diol by hydrolysis in methanolic potassium hydroxide and then converted to a crystalline phenylurethane which, after three recrystallisations from benzene had a melting point of 146.5–147° C. The infra-red spectrum of this derivative is given in FIG. IX. Elemental microanalysis gave the following results:

$C_{23}H_{28}N_2O_4$ (percent): C, 69.7; H, 7.06; N, 7.06. Found (percent): C, 69.7; H, 7.0; N, 7.1.

This phenylurethane had an identical infra-red spectrum (FIGS. IX and X) to, and produced no depression of melting point when mixed with, a phenylurethene prepared by the following procedure:

A sample of the diol corresponding to 6-formoxymethyl-cyclooct-3-enyl formate, prepared as in Example VI, was hydrogenated in methanol using 5% palladium on charcoal catalyst at 90 p.s.i. and room temperature for three hours. The methanol was evaporated from the filtered reaction mixture and the reduced diol converted to its phenylurethane which, after two recrystallizations from benzene, had a melting point of 144–146° C. The infra-red spectrum of this material is given in FIG. X.

EXAMPLE VIII

Paraformaldehyde (4.5 g.) and formic acid (98–100% w./w.; 25 ml.) were refluxed together until all of the solid had dissolved. The solution was cooled to room temperature and treated with cycloocta-1,3-diene (10.8 g.; prepared according to French Pat. No. 1,337,899). The heterogeneous mixture was stirred for three days at room temperature, during which time it becomes homogeneous. The clear solution was poured into distilled water (100 ml.), and extracted with methylene chloride (40 ml.). The organic extract was sequentially washed with water (15 ml.), saturated sodium bicarbonate (15 ml.) and water (15 ml.). After drying over magnesium sulphate the solvent was evaporated and the residue distilled to give the following fractions:

Fraction A1: B.P. below 140° C. at 15 mm. Hg, 0.7 g.
Fraction A2: B.P. 1140–158° C. at 15 mm. Hg, 1.3 g.
Fraction A3: B.P. 158–168° C. at 15 mm. Hg, 13.7 g.

Fraction A3 was redistilled and the following fractions claimed:

Fraction B1: B.P. 158–170° C. at 22 mm. Hg, 2.7 g.
Fraction B2: B.P. 170–178° C. at 22 mm. Hg, 10.4 g., 49% yield calculated as $C_{11}H_{16}O_4$.

Fraction B2 had a similar odour to that of fraction B2 in Example I. The infra-red spectrum of this fraction is given in FIG. XI. 10.0 g. of this fraction were hydrolysed by the action of methanolic potassium hydroxide to give, on distillation, the corresponding diol (7.0 g.), B.P. 115–125° C. at 0.05 mm. Hg. This diol was shown by gas-liquid chromatography (FIG. XII—0.5% diethyleneglycol succinate polymer stationary phase on Chromosorb G 70–80 mesh support; column temp. 150° C.) to consist of two components in a 3:1 ratio, neither of which occurred in the diol mixture corresponding to fraction B2 of Example I. 2.0 g. of this diol were hydrogenated in methanol at 85° C. and 200 p.s.i. using Raney nickel catalyst. Gas-liquid chromatography of the product showed that the major component was identical to the diol obtained by the hydrolysis of fraction B2 of Example VII. The diol was converted to its phenylurethane which, after three recrystallisations from benzene, had a melting point of 144–146° C., undepressed by admixture with the phenylurethane of Example VII. The infra-red spectra of the two phenylurethanes were identical (FIGS. XIII and IX). Nuclear magnetic resonance spectra (FIG. XIV), and mass spectra, show that the major component of fraction B2 is 4-formoxymethyl-cycloct-2-enyl formate and the minor component is 2-formoxymethyl-cyclooct-7-enyl formate.

EXAMPLE IX

The diformate fraction B2 of Example VIII (5 g.) was hydrogenated catalytically in ethereal solution at room temperature and 200 p.s.i. pressure employing platinum on carbon as catalyst. Filtration, evaporation of the solvent and distillation of the residue yielded 4.5 g. of product shown by gas-liquid chromatography to contain two components, the major one identical with the product fraction B2 of Example VII and having similar properties.

EXAMPLE X

A mixture of paraformaldehyde (45 g.), glacial acetic acid (200 ml.) and aqueous perchloric acid (1.0 ml.; 72% w./w.) was refluxed with stirring until all solid material had dissolved. Cis,cis-cycloocta-1,5-diene (108 g.) was then added dropwise over 20 minutes, and the refluxing continued for a further 30 minutes. The solution was cooled and anhydrous sodium acetate (5 g.) added to neutralise the perchloric acid. The reaction mixture was worked up in the same way as Example I and the product distilled to give the following fractions:

Fraction A1: B.P. 40–70° C. at 15 mm. Hg, 20 g.
Fraction A2: B.P. 70–140° C. at 15 mm. Hg, 19 g.
Fraction A3: B.P. 140–200° C. at 15 mm. Hg, 56 g.
Fraction A4: B.P. 200–240° C. at 15 mm. Hg, 16 g.

Fraction A3 was redistilled to give the following fractions:

Fraction B1: B.P. below 105° C. at 0.1 mm. Hg, 10 g.
Fraction B2: B.P. 105–112° C. at 0.1 mm. Hg, 36 g., 15% yield calculated as $C_{13}H_{20}O_4$.

The product has a faint, sweet odour, typical of acetate esters.

Fraction B2 (12.6 g.) was hydrolysed to the corresponding diol mixture using methanolic potassium hydroxide. The crude diol (8.1 g.; 96%) was shown by gas-liquid chromatography to contain the same seven major diol components in approximately the same proportions as the diol mixture prepared from fraction B2 of Example I.

4.05 g. of the diol obtained from fraction B2 was dissolved in 98–100% formic acid (40 ml.) and allowed to stand at room temperature for 24 hours. The solution became dark brown. The product was isolated, using the procedure described in Example I, distillation yielding 3.24 g. (64%) of diformate, B.P. 92–94° C. at 0.09 mm. Hg, which possessed an identical odour to that of fraction B2 of Example I.

The present invention includes within its scope a compound perfume base comprising a plurality of odiferous principles, one of which is a diformate or a mixture of diformates of the present invention. Such compound perfume bases may be prepared by known methods, and may include conventional perfume materials such as natural products, e.g. Oil of Sandalwood E. India, Oil of Clary Sage, Oil of Bergamot, Jasmin absolute and Violet Leaf absolute, and synthetic products, e.g. Rhodinol and the various aldehydes used in perfumery, including undecylenic aldehyde and methyl nonyl acetaldehyde.

Compound perfume bases according to the present invention may, for example, be used to perfume materials such as soap and other detergents, and talcum powder.

The following example illustrates the preparation of new perfumery compositions according to the present invention.

EXAMPLE XI

A compound perfume base of the lily type was prepared having the following composition:

|  | Part by weight |
|---|---|
| Linalool ex Bois de Rose | 40.0 |
| Oil of bergamot | 20.0 |
| Neroli bigarard | 0.5 |
| Oil ylang ylang bourbon extra | 0.3 |
| Oil of Cananga | 0.8 |
| Hydroxycitronellal extra prime | 12.0 |
| Lilac base | 6.0 |
| Heliotropine | 2.0 |
| Diformate fraction B2 of Example I | 10.0 |
| Musk ambrette | 2.0 |
| Terpineol extra prime | 6.4 |
|  | 100.0 |

In this composition the diformate fraction replaced Oil Orris Concrete in a conventional composition, and the product possessed a more floral note than the original.

In other experimental work, diformates of the present invention have been used in aromatic compositions in amount ranging from 0.5% to 70% by weight. They exert their effect even at low concentrations, and at high concentrations do not produce any unpleasant odours.

We claim:

1. The diformate fraction of empirical formula $C_{11}H_{16}O_4$ obtained by the reaction of cycloocta-1,5-diene with formaldehyde or paraformaldehyde in the presence of formic acid, said fraction having a boiling point of 90–110° C./0.05 to 0.2 mm. Hg, a density of 1.1–1.2 g./ml. at 22° C., and refractive index 1.47–1.50 at 21° C. in the D line of sodium.

2. The diformate fraction of empirical formula $C_{11}H_{16}O_4$ obtained by the reaction of cycloocta-1,3-diene with formaldehyde or paraformaldehyde in the presence of formic acid, said fraction having a boiling point of 170–178° C./22 mm. Hg and consisting essentially of 4-formoxymethyl-cyclooct-2-enyl formate and 2-formoxymethyl-cyclooct-7-enyl formate.

3. The diformate fraction of empirical formula $C_{11}H_{18}O_4$ obtained by the reaction of cyclooctene with formaldehyde or paraformaldehyde in the presence of formic acid, said fraction having a boiling point of 156–159° C./11 mm. Hg, and refractive index 1.4769 at 21° C. in the D line of sodium and consisting essentially of 4-formoxymethyl-cyclooctyl-formate.

4. A member of the class consisting of 4-formoxymethyl-cyclooctyl formate, 3-formoxymethyl-cyclooct-5-enyl formate, 6-formoxymethyl-cyclooct-3-enyl formate, 4-formoxymethyl-cyclooct-2-enyl formate and 2-formoxymethyl-cyclooct-7-enyl formate.

5. Process for the production of a mixture of diformates having valuable olfactory properties and containing a 4-formoxymethyl-cyclooctyl formate or a 6-formoxymethylcyclooct-3-enyl formate which comprises reacting an unsaturated hydrocarbon selected from the class consisting of cyclooctene, 1,5-cyclooctadiene, and cyclooctene and 1,5-cyclooctadiene carrying at most two methyl groups, the methyl groups being on carbon atoms not forming part of an olefinic linkage, with formaldehyde, or a compound which liberates formaldehyde under the reaction conditions, in the presence of formic acid, at a temperature between 0° C. and the reflux temperature of the reaction mixture, and separating from the reaction mixture the said diformate mixture so produced.

6. Process according to claim 5 wherein the compound which liberates formaldehyde is paraformaldehyde or methylal.

7. Process according to claim 5 in which the molecular ratio of unsaturated hydrocarbon to formaldehyde in the reaction mixture is in the range 1:1 to 1:2, and at least two molecular equivalents of formic acid are present for each mole of unsaturated hydrocarbon reactant.

8. Process according to claim 5 in which the reaction is carried out in the presence of an antioxidant and an alkali metal formate.

9. Process for the production of a mixture of diformates having valuable olfactory properties and containing 4-formoxymethylcyclooctyl formate or 6-formoxymethylcyclooct-3-enyl formate which comprises reacting an unsaturated hydrocarbon selected from the class consisting of cyclooctene and 1,5-cyclooctadiene with formaldehyde, or a compound which liberates formaldehyde under the reaction conditions, in the presence of formic acid at a temperature between 0° C. and the reflux temperature of the reaction mixture, and separating from the reaction mixture the said diformate mixture so produced.

10. Process according to claim 9 wherein the compound which liberates formaldehyde is paraformaldehyde or methylal.

11. Process according to claim 9 in which the molecular ratio of unsaturated hydrocarbon to formaldehyde in the reaction mixture is in the range 1:1 to 1:2, and at least two molecular equivalents of formic acid are present for each mole of unsaturated hydrocarbon reactant.

12. Process according to claim 5 in which the unsaturated hydrocarbon reactant is cycloocta-2,5-diene.

13. Process according to claim 9 in which the unsaturated hydrocarbon reactant is cyclooctene.

References Cited

UNITED STATES PATENTS

| | | | |
|---|---|---|---|
| 3,128,304 | 4/1964 | Lafont | 260—497 |
| 3,366,700 | 1/1968 | Ziegenbein et al. | 260—488 |
| 3,433,828 | 3/1969 | Norell | 260—488 |

OTHER REFERENCES

S. Olsen et al., Naturforsch 1, 448–458 (1946).

LORRAINE A. WEINBERGER, Primary Examiner

V. GARNER, Assistant Examiner

U.S. Cl. X.R.

252—522; 260—491, 494, 617 M